United States Patent [19]

Fukushima

[11] Patent Number: 4,903,227

[45] Date of Patent: Feb. 20, 1990

[54] PROCESSOR FOR DIGITIZED VIDEO HAVING COMMON BUS FOR REAL TIME TRANSFER OF INPUT AND OUTPUT VIDEO DATA

[75] Inventor: Nobuo Fukushima, Nagasaki, Japan

[73] Assignee: Mitsubishi Denki Kabushiki Kaisha, Tokyo, Japan

[21] Appl. No.: 79,434

[22] Filed: Jul. 30, 1987

Related U.S. Application Data

[63] Continuation-in-part of Ser. No. 661,949, Oct. 17, 1984, abandoned.

[51] Int. Cl.[4] .................. G06F 15/66; G06F 3/14; G06F 13/16; G06F 13/40
[52] U.S. Cl. .................. 364/900; 364/927.2; 364/521
[58] Field of Search ... 364/200 MS File, 900 MS File, 364/521; 358/160, 166; 340/798, 799

[56] References Cited

U.S. PATENT DOCUMENTS

| | | | |
|---|---|---|---|
| 3,875,391 | 4/1975 | Shapiro et al. | 235/156 |
| 4,409,669 | 10/1983 | Neumann et al. | 364/900 |
| 4,485,402 | 11/1984 | Searby | 358/160 |
| 4,538,179 | 8/1985 | Tsutomu et al. | 358/166 |
| 4,628,467 | 12/1986 | Nishi et al. | 364/521 |
| 4,635,292 | 1/1987 | Mori et al. | 382/41 |
| 4,652,921 | 3/1987 | Rae-Smith | 358/160 |
| 4,701,865 | 10/1987 | Goodman | 364/521 |

Primary Examiner—Archie E. Williams, Jr.
Assistant Examiner—Ayni Mohamed
Attorney, Agent, or Firm—Bernard, Rothwell & Brown

[57] ABSTRACT

A pair of bus controllers are connected to a common bus and operated by high speed video digitizing timing signals for passing, in real time, the digitized data from incoming digitizing circuitry to output circuitry which converts the digitized data into video signals. A memory is connected by another bus to a computer, and a bus interface or selective dual ports of the memory selectively connect the memory to the common digital data bus so that digitized signals are written to and read from the memory in real time in accordance with the high speed timing signals and corresponding address signals.

4 Claims, 5 Drawing Sheets

PROCESSOR FOR DIGITIZED VIDEO HAVING COMMON BUS FOR REAL TIME TRANSFER OF INPUT AND OUTPUT VIDEO DATA

CROSS-REFERENCE TO RELATED APPLICATION

This application is a continuation-in-part of application Ser. No. 661,949, filed Oct. 17, 1984, and now abandoned.

BACKGROUND OF THE INVENTION

1. Field of the Invention

This invention relates to a signal processor for digitizing and processing video signals.

2. Description of the Prior Art

For a video display of moving objects without perceptible jerky movement, it is required that a predetermined number of frames per unit time be displayed, for example, 60 frames per second.

A prior art system shown in FIG. 1 has been employed for digitizing and processing video signals. Line 1, carrying a conventional composite video signal VI including horizontal and vertical synchronization signals and an encoded color or chrominance signal, is connected to an input of a decoder 2 which detects and separates the horizontal and vertical synchronizing signals H, V and which, from the intensity and chrominance signals, generates separate red, green and blue color intensity signals R, G, B. The color intensity signal outputs R, G, B of the decoder 2 are connected to respective inputs of an analog-to-digital (A/D) converter circuit 3 having A/D converters for each signal R, G, B to convert the color signals R, G, B into parallel digital signals R', G', B'. The digital outputs R', G', B' of the converter circuit 3 are connected to a large word (24-bit) port or parallel input of a frame memory which is operated by a timing and addressing circuit 10 to store the successive digitized color signals R', B', G' for one or more frames. A DMA controller and bus interface circuit 5 is connected to a small word (8-bit) port of the frame memory 4 for transferring data D from the frame memory 4 to a main memory 7 or a disc controller 8, and vice-versa, over a data bus 11 which is also connected to a computer 6. A program control channel (PCCH) 12 is connected to the interface 5, computer 6, main memory 7 and disc controller 8 for carrying various address, control and timing signals used to control the transfer of data D from one of the units 5, 6, 7 and 8 to another of these units, and to enable and disable the timing and addressing circuit 10 under the control of the computer 6. The memory 7 contains programs and data for the computer 6. A disc 9 is operated by the disc controller 8 for storing data. The timing and addressing circuit 10, controlled by signals on PCCH 12 and bus 11 as well as by the sync signals H, V, generates the timing and control signals needed to operate the analog-to-digital converter circuitry 3 to generate the successive large word digits of the parallel signals R', G', and B' and to operate the large port input of frame memory 4 to store these signals for each desired frame. A large port output of the frame memory 4 also operated by the timing and addressing circuit 10 is connected to inputs of a digital-to-analog (D/A) converter circuit 13 which contains D/A converters operated by timing signals from unit 10 for each of the processed intensity digital signals R'', G'', B'' to generate analog output signals which can be applied to an encoder 14. The timing circuit 10 also generates output horizontal and vertical synchronizing signals H', V' which are applied to encoder 14 to regenerate a composite video signal VO on an output line 1' for being applied to a color monitor (not shown) to display a processed frame or frames stored in memory 4.

In operation of the video signal processor of FIG. 1, the video signal VI is decoded by the decoder 2 and separated into separate red, blue and green color intensity signals R, B, G. After the timing circuit is enabled by the computer 6 and initialized by a vertical sync pulse, these color signals are converted into respective parallel series of digital color signals R', B', G' by the A/D converter circuitry 3 over a time segment corresponding to one picture frame. The successive large word bytes forming the respective digital color signals R', B', G' are written in the frame memory 4 at successive addresses determined by address counting in circuit 10 for a complete frame. When a complete frame has been stored in the memory 4, the bytes of this frame are transmitted to the main memory 7 by DMA (direct memory access) and interface circuit 7 under control of the computer 6. The data transmitted to the memory 7 is then subjected to picture processing by the computer 6 which reads and writes the data bytes over bus 11 in accordance with address and control signals on PCCH 12. The processed bytes forming a picture frame are sent to the disc controller 8 by DMA over bus 11 and stored on the disc 9. Data stored in the disc 9, or in the memory 7, is transmitted to the frame memory 4 by way of the bus 11 and the DMA control and interface 5. Processed data forming digitized color signals R'', G'', B'' are transferred in parallel streams under the control of unit 10 to the D/A converter circuitry 13 which produces the output analog red, green and blue signals for being combined with the horizontal and vertical synchronizing signals by encoder 14 to produce the composite color video signal VO which may then be displayed on a color monitor (not shown).

In the conventional system as described above and employing an NTSC input signal VI, a display picture frame has a matrix of pixels formed by 480 rows and 512 columns with each pixel formed by 3 bytes, one 8-bit byte for each of the red, green and blue intensity components. The bus 11 is constituted by an 8-bit data bus and the transmission speed of DMA bus interface is 64k bytes per second which thus results in the following time T required for transferring one picture frame to the main memory 7:

$$T = \frac{480 \times 512 \times 8 \times 3}{65536 \times 8} = 11.2 \text{ sec.}$$

Further, a similar period of time is required to transfer data forming a processed picture frame back to the frame memory 4 through DMA interface 5. Accordingly, the input of a picture frame from the video signal VI, and the outputting of the processed data back to the frame memory for use in generating the display video signal VO requires a duration of more than 22 seconds. The conventional DMA interface 5 under control of the computer 6 can only transmit data at a rate of about 64k bytes per second. Further, during the transmission of data through DMA interface 5 to and from the main memory 7 or the disc controller 8, the DMA unit 5 seizes control of the bus 11 and the computer 6 cannot perform any processing which requires the use of bus 11.

SUMMARY OF THE INVENTION

An object of the invention is to provide a video signal processor which has real time transfer of digitized video data to the main memory of the computer together with parallel transfer of the real time video data to output circuitry for converting the digital data back into video signals suitable for operating a monitor.

In accordance with this and other objects of the invention, the present invention includes a pair of bus controllers connecting a common bus to the respective input and output video conversion circuitry together with means connecting the common bus to the computer memory, and wherein a high speed timing and addressing unit operates the bus controllers and the main computer memory to enable real time transfer of the digitized video signals to and from the computer memory, as well as between the input and output bus controllers.

In one embodiment of the invention, a bus interface circuit, also operated by the high speed timing and addressing unit, connects the common bus to the computer bus for enabling, under the control of the computer, the transfer of high speed timing and addressing signals and real time digitized signals from the common bus to the computer main memory bus.

In another embodiment, the computer main memory is a dual port memory having one port connected to the common bus and the second port connected to the computer bus for enabling transfer of the real time digitized data over the common bus to the computer main memory.

DESCRIPTION OF THE PREFERRED EMBODIMENTS

Figure 1:
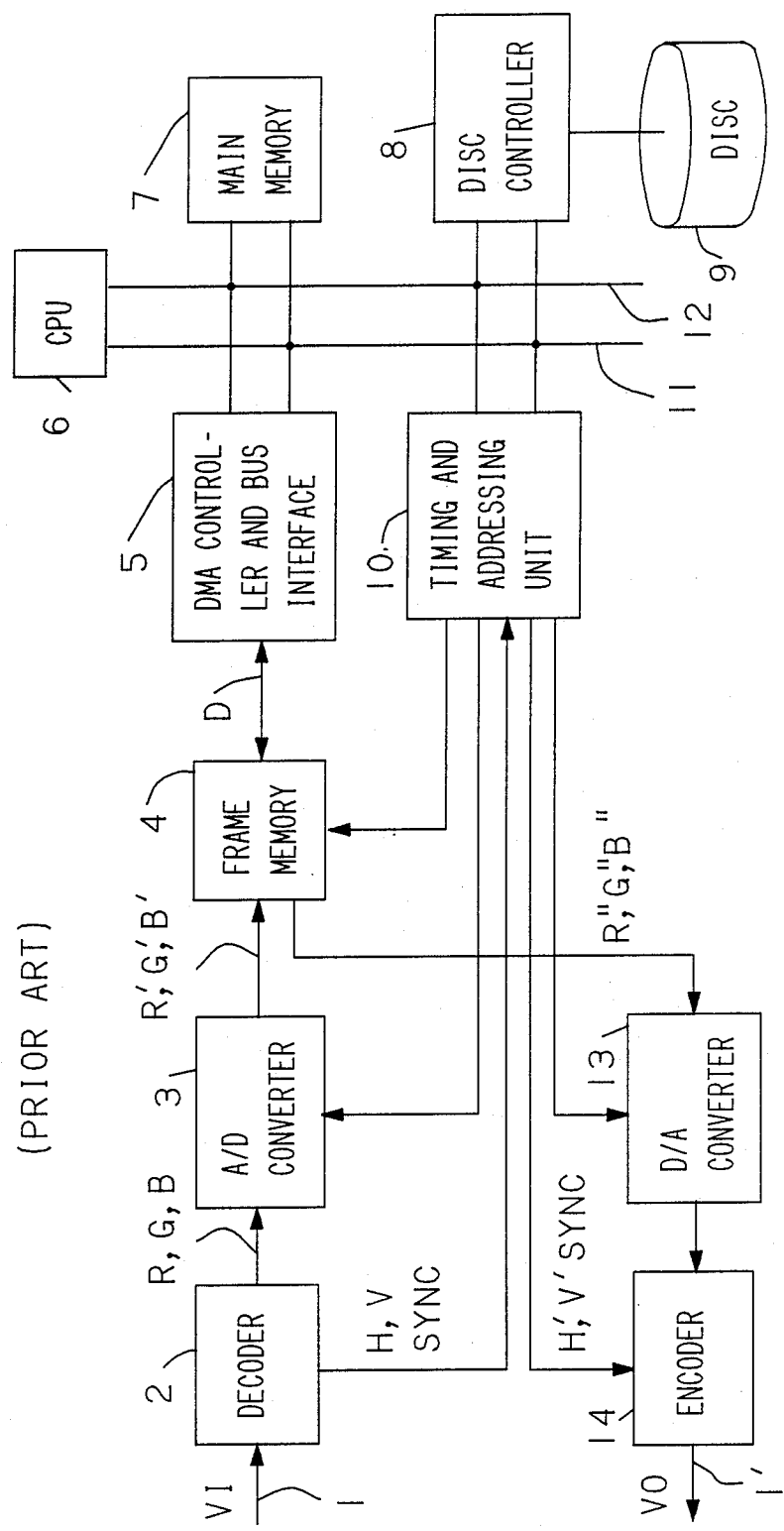
FIG. 1 is a block diagram of a conventional video signal processor.
Figure 2:
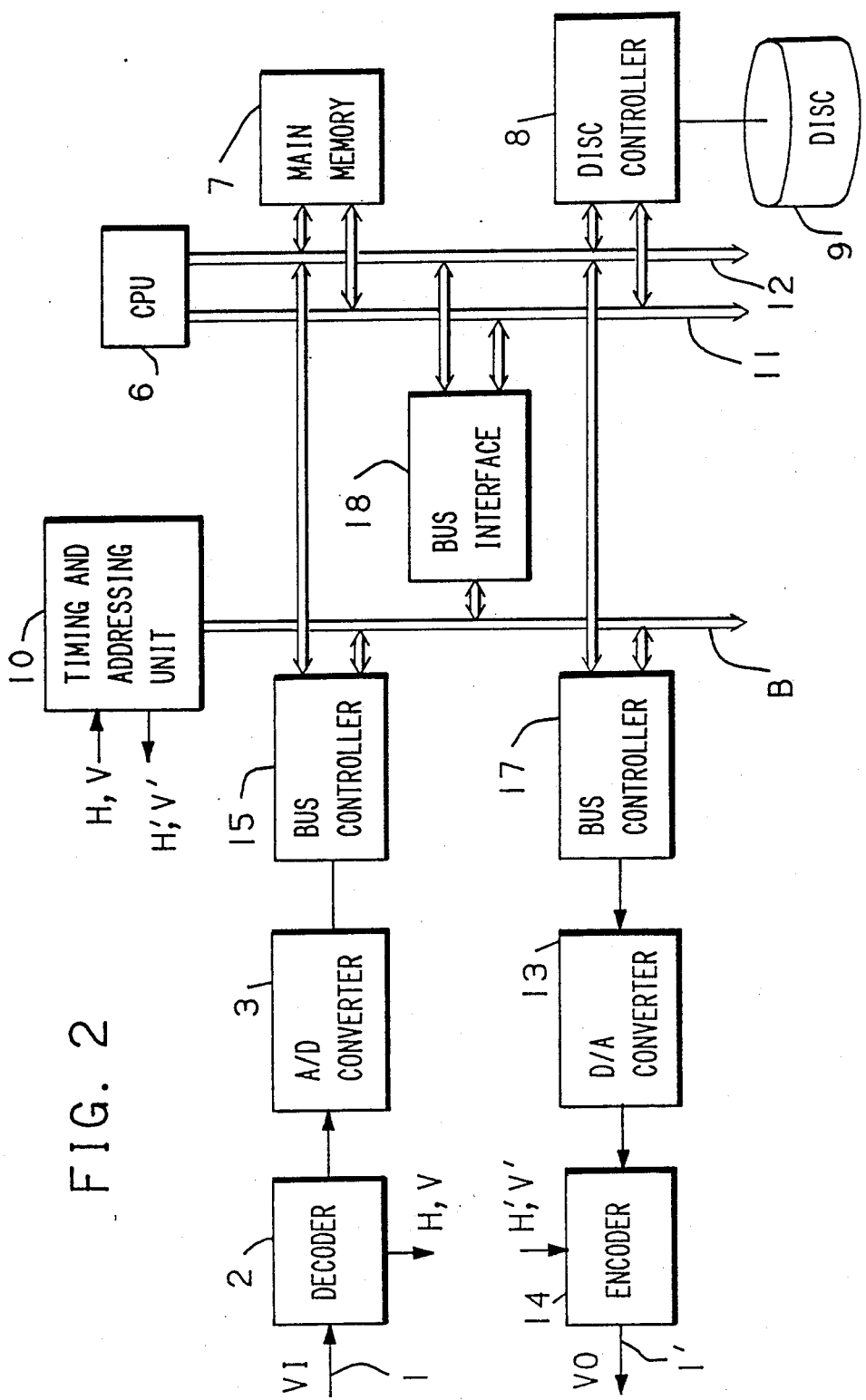
FIG. 2 is a block diagram of a video signal processor in accordance with one embodiment of the present invention.

One embodiment of the invention, as shown in FIG. 2, has parts identified by reference characters used in FIG. 1 to indicate similar parts. The circuit of FIG. 2 includes a common bus B which has data lines, timing signal lines and address signal lines. The timing signal lines and address signal lines are connected to outputs of the timing and addressing unit 10. A bus controller 15 has (1) inputs connected to the control bus 12 for being enabled or disabled by the computer 6, (2) data inputs connected to outputs of A/D converter 3, (3) data outputs connected to data lines of bus B, (4) control outputs connected to control inputs of A/D converter 3, and (5) timing and control inputs connected to timing lines of the bus B such that, when the bus controller 15 is enabled by the computer 6, the bus controller 15 is operated by the high speed timing signals from unit 10 to operate the A/D converter 3 and pass digitized signals from A/D converter 3 to the data lines of bus B in real time. A bus controller 17 has (1) inputs connected to the control bus 12 for being enabled or disabled by the computer 6, (2) data inputs connected to data lines of bus B, (3) data outputs connected to data inputs of the D/A converter 13, (4) control outputs connected to control inputs of D/A converter 13, and (5) timing and control inputs connected to timing lines of the bus B such that, when the bus controller 17 is enabled by the computer 6, the bus controller 17 is operated by the timing signals from unit 10 to pass data signals from the data lines of bus B to data inputs of D/A converter 13 and to control the D/A converter 13 to convert the digital signals on bus B into analog signals in real time. When both bus controllers 15 and 17 are enabled, the digitized video signals are continuously passed in real time from the A/D converter 3 to D/A converter 13 via bus controller 15, bus B and bus controller 17 so that the output video signal VO is the same as the input video signal VI.

A bus interface 18, which can be formed from bus controllers similar to units 15 and 17, is connected to the common bus B, the data bus 11 and control bus 12. Control inputs of the bus interface 18 from control bus 12 allow the computer 6 to enable and disable the the bus interface 18 which, when enabled, is operated by timing signals from bus B to pass timing and address signals from the bus B to the bus 12. The computer 6 through bus 12 also controls the mode of bus interface 18 to either pass data signals from bus B to bus 11 or to pass data signals from bus 11 to bus B. When the bus interface 18 is enabled by the computer 6, the processing by the computer 6 is held and the addressing and timing functions on bus 12 are taken over by the outputs of the timing and addressing unit 10 during one or more picture frames for transferring the digitized data signals either from bus B to bus 11 or from bus 11 to bus B in real time. These addressing and timing signals on bus 12 then control the transfer of the data signals on bus 11 to and from the main memory 7 and/or disc controller 8 as enabled by the output of the computer 6.

In the embodiment of FIG. 2, the data outputs of A/D converter 3, the data lines of buses B and 11, and the data inputs of D/A converter 13 are all the same size. For black and white video signals, this size is 8-bits, whereas for color video signals, the size is at least 24 or 32 bits.

Figure 4:
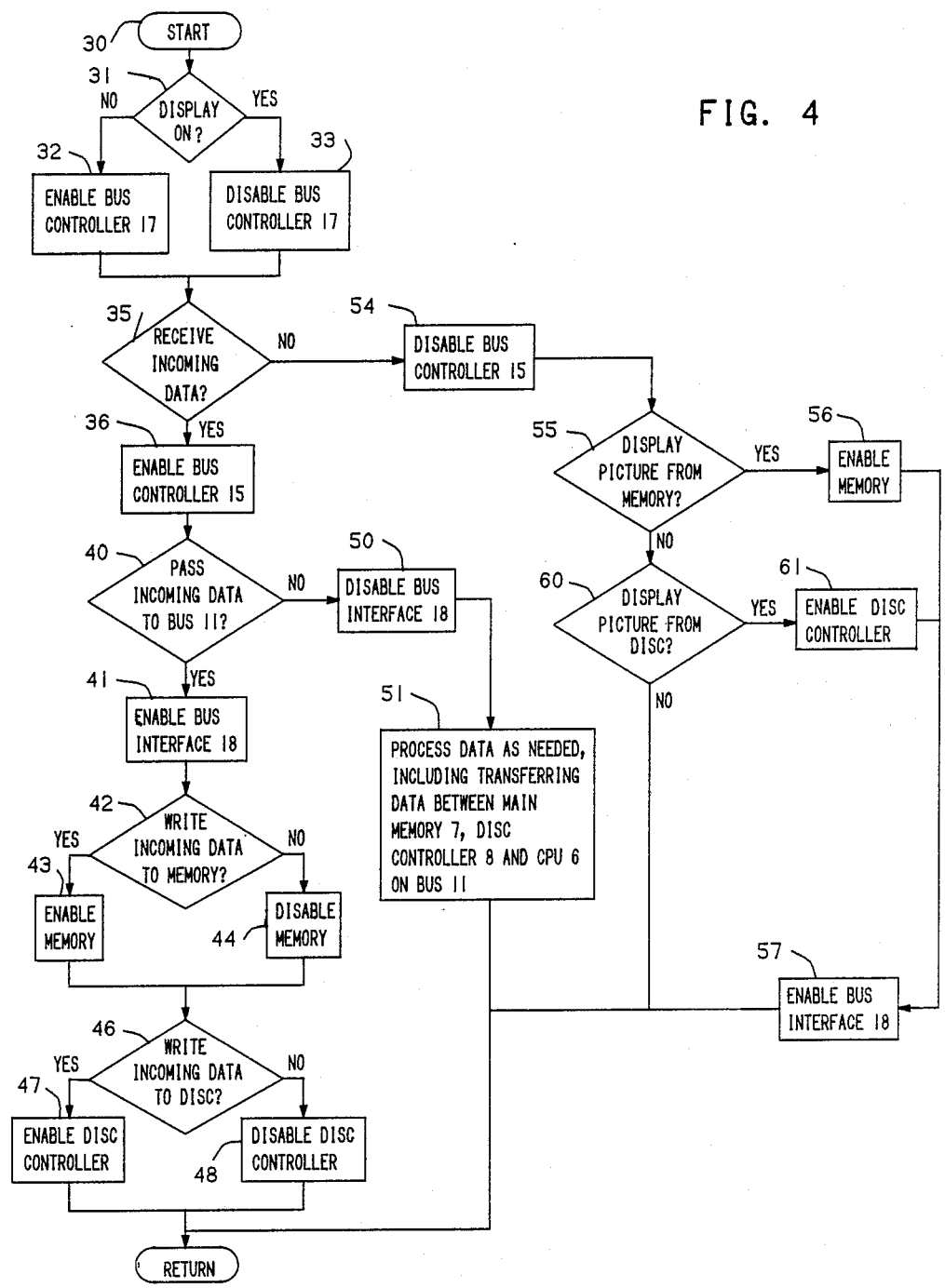
FIG. 4 is a process flow chart for a computer program routine of the computer of FIG. 2 to control the mode of operation.

The computer 6 controls the overall operation of the processor in accordance with the program procedure illustrated in FIG. 4. From the entering point 30 of the program the computer proceeds to step 31 where a decision is made to pass digital signals to the output conversion circuitry, and particularly selects one of steps 32 or 33 to enable or disable the output bus controller 17. In the next step 35 a decision is made on whether to pass the digitized signals produced by A/D converter 3 to the bus B, and if true, the bus controller 15 is enabled in step 36. With the bus controller 15 enabled the successive digital video signals which are produced by the A/D converter circuit 3 are passed by the bus controller 15 to the bus B. In the following step 40, a decision is made on whether to pass the incoming data signals on bus B to bus 11, and if true, the bus interface 18 is enabled in step 41. The computer then in step 42 decides if the incoming data on bus 11 is to be written in the main memory 7, and, if true, to branch to step 43 to enable the main memory or, if false, to branch to step 44 to disable the main memory 7. A similar decision is made in the next step 46 to either enable disc controller 8, step 47, or disable disc controller 8, step 48. Thus, the next picture frame that is digitized by the A/D converter will be stored in the main memory 7 and/or or disc controller 8. From disc controller 8, the data is written to disc 9.

It is noted that the transfer of the picture frame data to the main memory 7 and or to the disc controller 8 occurs in real time, i.e., only requires about 17 ms when the picture frame data repetition rate is 60 hertz.

If the decision in step 40 is not to enable bus interface 18, then the program proceeds to step 50 where the bus interface 18 is disabled. The bus 11 and 12 are thus free for use by the computer 6 to read program instructions from the main memory 7 and to read and write data from and to the main memory 7 and the disc controller 8. Thus, one or more picture frames can be processed by the computer while the incoming video signal VI is passed via decoder 2, A/D converter 3, bus controller 15, bus B, bus controller 17, D/A converter 13 and encoder 14 to output line 1' as output signal VO.

If the decision in step 35 is false, the program proceeds to step 54 where the bus controller 15 is disabled, and then to step 55 where a decision is made on whether to display a picture frame from main memory 7. If step 55 is true, the program proceeds to step 56 where the main memory 7 is enabled and then to step 57 where the bus interface 18 is enabled so that data from the main memory 7, under the control of the timing and addressing unit 10 is passed to bus 11, bus interface 18, bus controller 17 and D/A converter 13 which produces an analog output for encoder 14 to construct an output video signal VO.

Similarly, the program in step 60, reached when the decision in step 55 is false, makes a decision to pass data from the disc 9 for display on the monitor. When the decision 60 is true the program proceeds to step 61 where the disc controller 8 is enabled to read data from the disc 9 into the disc controller buffer. From step 61 the program proceeds to the step 57 where bus interface 18 is enabled and the data from the controller buffer is read under the control of unit 10 to pass the data through the bus 11, the interface 18 and the bus B to the output conversion circuitry operating the monitor.

It is noted that the reading out of picture frame data from main memory 7 and the disc controller 8 onto the bus 11 is performed in real time, i.e., at the rate that the equivalent analog signal occurs in a video signal, under the control of the timing and addressing unit 10. The buses 11 and 12 will be occupied by the continuous cycling of the reading of a picture frame for the desired period of observation of the frame on the monitor.

Figure 3:
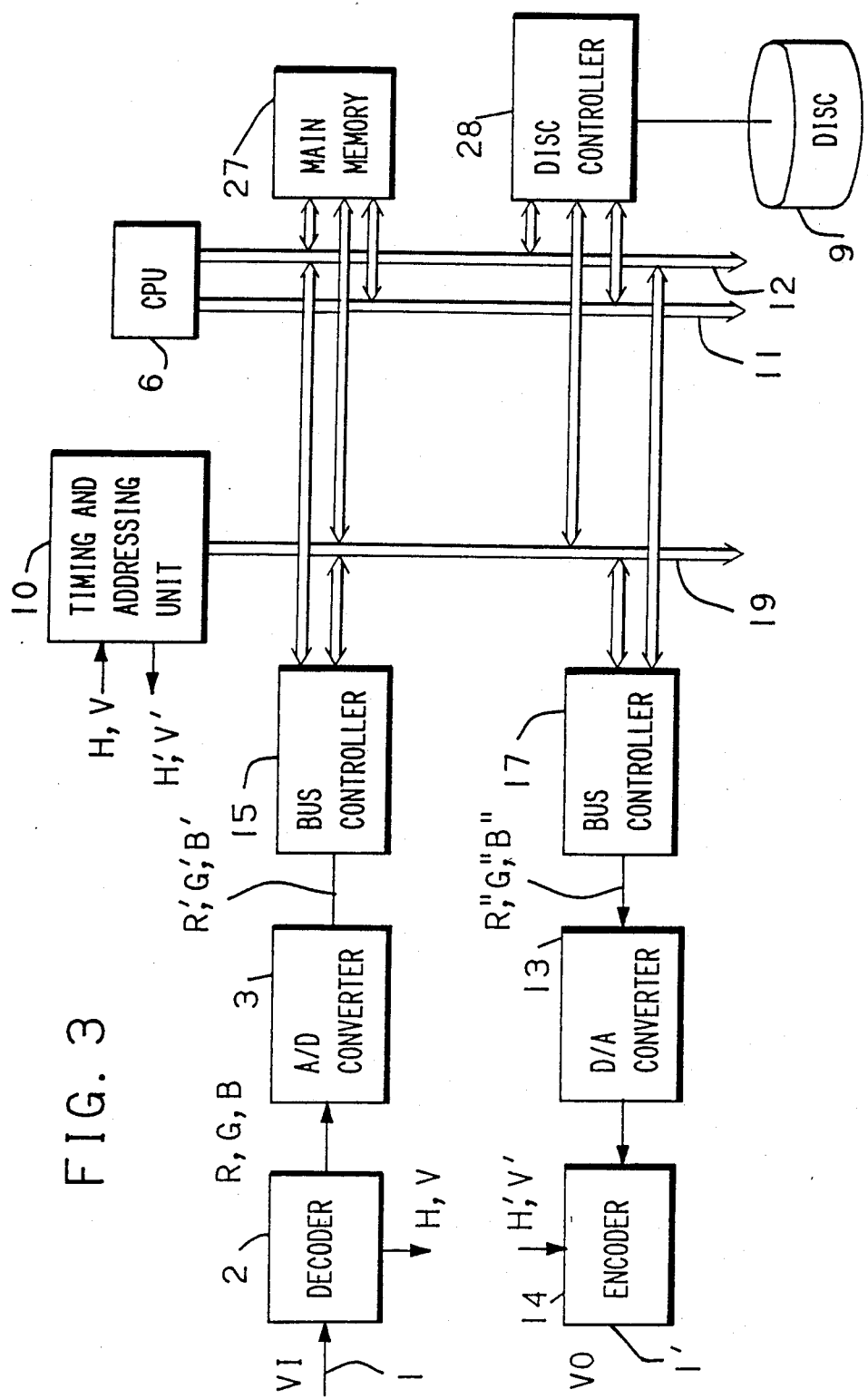
FIG. 3 is a block diagram of a video signal processor in accordance with a second embodiment of the invention.

A modified embodiment of the invention is illustrated in FIG. 3 wherein parts are identified by reference numerals used in FIGS. 1 and 2 to indicate similar parts. In this embodiment a common bus 19 connects bus controllers 15 and 17 as well as main memory 27 and disc controller 28. Timing and address lines in the bus 19 are connected to the timing and addressing unit 10. The number of data lines in bus 19 as well as the tristate buffer amplifiers in the bus controllers 15 and 17 are selected to handle the digitized red, green and blue signals R', G' and B'. The main memory 27 and the buffer memory of the disc controller 28 are dual ported memories, such as conventional computer video RAM, wherein the ports connected to bus 19 have a word size (e.g., 24 or 32 bits) corresponding to the data lines, and the port connected to data bus 11 can have a smaller word size (e.g., 8 or 16 bits). The address lines in bus 19 and in bus 12 are correspondingly set to account for the different word size. Enablement and disablement of the memory ports for reading and writing is controlled by the computer 6.

Figure 5:
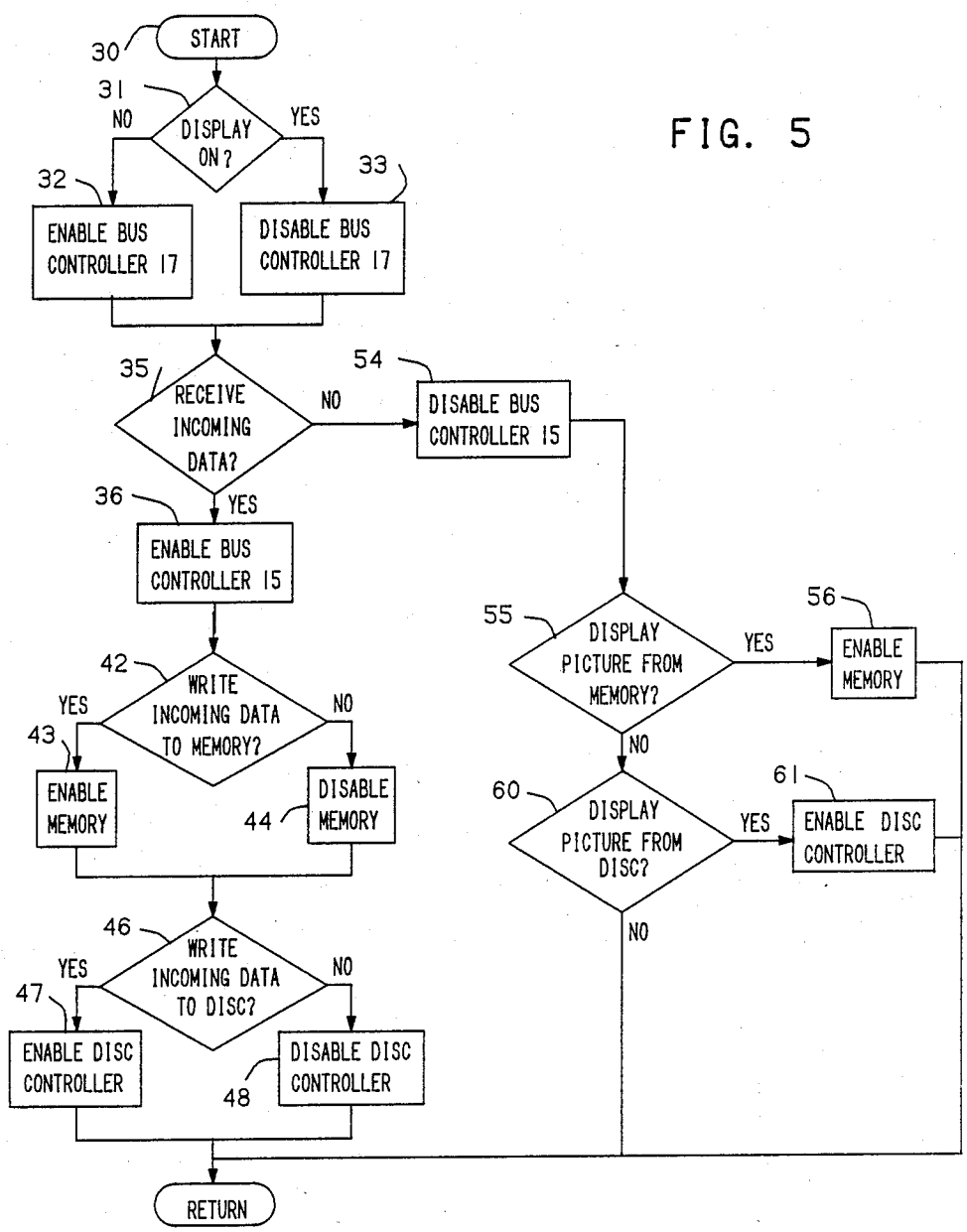
FIG. 5 is a process flow chart for a computer program routine of the computer of FIG. 3 for controlling the mode of operation of the processor.

A program for operating the CPU 6 of FIG. 3 is shown in FIG. 5 wherein reference numbers of steps in FIG. 4 are used to indicate similar steps. It is noted that the procedures are substantially similar except that steps involving enablement and disablement of the bus interface 18 of FIG. 2 are eliminated or modified. Bus controllers 15 and 17 can be enabled to pass the successive digital signals R', G', B' through bus controller 15, bus 19 and bus controller 17 to D/A converter 13 to operate encoder 14 and generate video signal VO to display the incoming picture. Main memory 27 and/or disc controller 28 can be enabled to write an incoming picture frame from bus 19 to the main memory 27 and/or disc controller 28. When neither the main memory 27 nor disc controller 28 have an enabled port connected to bus 19, the computer 6 is free to read computer instructions from main memory 27 and to read and write data from and to the main memory 27 and disc controller 28. Bus controller 15 can also be disabled and then data forming a picture frame can be read, in real time, under control of the timing and addressing unit 10, from the main memory 27 or the buffer memory of disc controller 28 to pass the data to bus 19, bus controller 17 and D/A converter 13 to produce video signal VO and display the selected picture frame on the monitor. During the time that is desired to view the selected picture frame on the monitor, the main memory 27 or the disc controller 28 will not be available to the computer 6 due to its control being seized by unit 10 for the continuous cycling and transmission of the picture frame data.

Since many modifications, variations and changes in detail may be made to the above described embodiments, it is intended that all matters described in the foregoing description and shown in the accompanying drawings be interpreted as illustrative and not in a limiting sense.

What is claimed is:

1. A video signal processor comprising:
   first bus means including a plurality of data lines and a plurality of control lines,
   a memory connected to the first bus means and including a predetermined picture processing program,
   a computer connected to the first bus means for reading program instructions from the memory, reading data from the memory, processing the data, and writing the processed data to the memory,
   second bus means including a plurality of data lines and a plurality of timing and addressing lines,
   input video processing means connected to the second bus means for converting an input video signal into consecutive digitized video signal data applied to the second bus means,
   output video processing means connected to the second bus means for converting consecutive digitized video signal data from the second bus into an output video signal,
   timing and addressing means connected to the second bus and operated in synchronism with sync signals of the input video signal for generating timing and addressing signals on the second bus means to operate the input and output video processing means;

means controlled by the computer for selectively connecting the second bus means to the memory, and said computer including means for operating in one of the following three modes: (1) disabling the selective connecting means, and enabling both the input and output video processing means for passing the consecutive digitized video signal data from the input video processing means to the second bus means and output video processing means, (2) enabling the input video processing means and the selective connecting means to write consecutive digitized video signal data into the memory in accordance with the timing and addressing signals from the timing and addressing means, and (3) disabling the input video processing means, and enabling the output video processing means and the selective connecting means for reading out data from the memory onto the second bus means and the output video processing means in accordance with the timing and addressing signals from the timing and addressing means.

2. A video signal processor as claimed in claim 1 wherein the selective connecting means includes a bus interface connected between the first and second bus means and controlled by the computer for selectively connecting the first and second bus means.

3. A video processor as claimed in claim 1 wherein the selective connecting means includes selective dual port means coupled to the memory, said dual port means having a first port connected to the first bus means and a second port connected to the second bus means, and said dual port means being operated by the computer to selectively connect the memory to the first and second bus means.

4. A video signal processor as claimed in claim 1 wherein the memory including RAM, and disc means includes a disc and a disc controller.

* * * * *